United States Patent [19]
Niwa

[11] Patent Number: 5,994,251
[45] Date of Patent: *Nov. 30, 1999

[54] SINTERED CERAMIC MAINLY COMPOSED OF ALUMINA AND A SINTERED CERAMIC PART CONSISTING OF A SINTERED CERAMIC MAINLY COMPOSED OF ALUMINA

[75] Inventor: Tomonori Niwa, Aichi, Japan

[73] Assignee: NGK Spark Plug Co., Ltd., Aichi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/861,112

[22] Filed: May 21, 1997

[30] Foreign Application Priority Data

May 23, 1996 [JP] Japan ................................. 8-153311
Apr. 30, 1997 [JP] Japan ................................. 9-126483

[51] Int. Cl.$^6$ .................................................. C04B 35/10
[52] U.S. Cl. ............................................ 501/127; 501/153
[58] Field of Search ...................................... 501/127, 153

[56] References Cited

U.S. PATENT DOCUMENTS

| | | | |
|---|---|---|---|
| 3,772,416 | 11/1973 | Clendenen | 501/127 |
| 3,834,915 | 9/1974 | Cleveland . | |
| 3,875,277 | 4/1975 | Bratton et al. . | |
| 4,859,638 | 8/1989 | Wada et al. . | |
| 4,902,651 | 2/1990 | Wada et al. . | |
| 4,996,177 | 2/1991 | Takagi et al. | 501/127 |
| 5,114,891 | 5/1992 | Kunz et al. | 501/127 |
| 5,352,643 | 10/1994 | Staehler et al. | 501/127 |
| 5,384,293 | 1/1995 | Omori et al. . | |
| 5,387,268 | 2/1995 | Hiraiwa et al. | 501/127 |
| 5,447,894 | 9/1995 | Yasuoka et al. | 501/152 |

FOREIGN PATENT DOCUMENTS

| | | |
|---|---|---|
| 0094354 | 11/1983 | European Pat. Off. . |
| 0497241 | 1/1992 | European Pat. Off. . |

OTHER PUBLICATIONS

"Fabrication of Sintered Alumina of High Density and High Strength using Pressing and Vacuum Slip Casting Techniques" Mizuta et al. Nyu Seramikkusu 3(7) 87–94, 1990.

*Primary Examiner*—Paul Marcantoni
*Attorney, Agent, or Firm*—Snider & Chao; Ronald R. Snider

[57] ABSTRACT

A sintered alumina-based ceramic has a relative density of equal to or higher than 95%, an average grain size in a range of 10–25 $\mu$m and a fracture toughness Kc equal to or lower than 3.0 MPam$^{1/2}$ Furthermore. In a machinability evaluation test using a surface grinder, the ceramic exhibits equal to or less than 310 W of increase in the load on a motor rotating a grinding wheel of the surface grinder. The machinability evaluation test is performed under the following condition.

(1) The dimension of a test piece of the sintered alumina-based ceramic is larger than 15 mm in width, larger than 30 mm in length and larger than 10 mm in height.

(2) The test piece is fixed on a table of said surface grinder and ground by the grinding wheel along a direction of its length.

(3) The grinding wheel has a dimension of 10 mm in width and 200 mm in outer diameter, and consists of synthetic (or artificial) diamond abrasive grains more than 80 wt % of which are in a grain size range of 74–88 $\mu$m, and which are resin-bonded at 3.3 cts/cm$^3$ of weight content per unit volume.

(4) The circumferrential speed of said grinding wheel is 2400 m/min, the table traversing speed is 60 mm/min, and the infeed per traverse is 3 mm.

22 Claims, 8 Drawing Sheets

No. 6
(Average grain size 15μm)

No. 7
(Average grain size 20μm)

No. 9
(Average grain size 12μm)

No. 4
(Average grain size 9μm;
comparative sample)

SINTERED CERAMIC MAINLY COMPOSED OF ALUMINA AND A SINTERED CERAMIC PART CONSISTING OF A SINTERED CERAMIC MAINLY COMPOSED OF ALUMINA

FIELD OF THE INVENTION

This invention relates to a sintered alumina-based ceramic and a sintered alumina-based ceramic part, particularly those having excellent machinability.

BACKGROUND OF THE INVENTION

In the field of semiconductor device production, such as of IC (integrated circuit) or LSI (Large Scale Integration), a ceramic holder has been used for holding and positioning a semiconductor wafer in a production apparatus. Since the wafer is treated at a high temperature in the apparatus, a sintered alumina-based ceramic has been used for the material of said holder.

In the process of wafer treatment, particularly in a diffusion process for developing complicated circuit patterns on the wafer, a very high accuracy of wafer positioning is required, so that the wafer holding surface of said holder should be precisely finished by polishing, grinding or other machining. However, the alumina-based ceramic as a conventional material for such holder is very dense and tough, so that the machining thereof is generally very difficult and causes an increase in the production cost. Such problem that the increase in the machining cost directly leads to a price-raise of the products frequently occurs not only for the wafer holder, but also for other alumina-based ceramic products, such as sliding parts.

In order to enhance the efficiency of the ceramic-machining, it seems effective to use a porous sintered alumina ceramic as the material for said parts instead of a dense alumina ceramic however, for ceramic parts such as the wafer holder used under a high vacuum atmosphere, the porous ceramic is not suitable since water or other molecules adsorbed in the open pores are discharged during the evacuation, thereby preventing the atmosphere from reaching to sufficient degree of vacuum.

The object of this invention is to offer a sintered alumina-based ceramic and a sintered alumina-based ceramic part which exhibit good machinability despite of having high density, thereby being suitable for a parts used under a high vacuum atmosphere, such as of semiconductor treatment.

SUMMARY OF THE INVENTION

For accomplishing the object mentioned above, the first constitution of the sintered alumina-based ceramic of this invention is characterized as follows. The ceramic has a relative density of equal to or higher than 95% and an average grain size in a range of 10–25 μm. Furthermore, in a machinability evaluation test using a surface grinder, the ceramic exhibits equal to or less than 310 W of increase in the load on a motor rotating a grinding wheel of the surface grinder. The machinability evaluation test used in this invention is performed under the following condition.

(1) The dimension of a test piece of the sintered alumina-based ceramic is larger than 15 mm in width, larger than 30 mm in length and larger than 10 mm in height.

(2) The test piece is fixed on a table of said surface grinder and ground by the grinding wheel along the direction of its length.

(3) The grinding wheel has a dimension of 10 mm in width and 200 mm in outer diameter, and consists of synthetic (or artificial) diamond abrasive grains more than 80 wt % of which are in a grain size range of 74–88 μm, and which are resin-bonded at 3.3 cts/cm$^3$ of weight content per unit volume.

(4) The circumferrential speed of said grinding wheel is 2400 m/min, the table traversing speed is 60 mm/min, and the infeed per traverse is 3 mm.

In this invention, "relative density" of ceramic means a ratio presented by a percentage of the apparent density of the ceramic against the theoretical density thereof.

The inventor has discovered that even if the relative density of a sintered alumina-based ceramic is enhanced to be equal to or higher than 95%, the machinability thereof for grinding, sanding, polishing, etc. improves significantly when the average grain size is adjusted in said range, and when the increase in the load on the motor due to the grinding is equal to or less than 310 W in said machinability evaluation test. This effect contributes much for enhancing the machining efficiency for alumina-based ceramic parts thereby improving the cost performance for producing the parts. Furthermore, the ceramic of this invention is dense (or closed) enough to have few open pores, so that it is suitable for ceramic parts used under a high vacuum atmosphere, such as of semiconductor treatment.

If the increase in the load on the motor due to the grinding in the machinability evaluation test ("machining load", hereinafter) exceeds 310 W, the superiority in the machinability of the ceramic against the conventional sintered alumina-based ceramic may not be secured. When the machining load is adjusted to be equal to or less than 220 W, further improved machinability of the ceramic may be expected.

The second constitution of the sintered alumina-based ceramic of this invention is characterized as follows. The ceramic has a relative density of equal to or higher than 95% and an average grain size in a range of 10–25 μm. Furthermore, in a machinability evaluation test using a surface grinder performed in the same condition described for said first constitution, the ceramic exhibits a value of $(I-IO)/IO$ of equal to or less than 0.7, where I is the electric current of the motor rotating said grinding wheel during grinding, and IO is the electric current of the motor in an idling rotation without grinding.

Even if the relative density is enhanced to be equal to or higher than 95%, the machinability of the sintered alumina-based ceramic for such as grinding, sanding, polishing, etc. improves significantly when the average grain size is adjusted in said range, and the value of said $(I-IO)/IO$ is equal to or less than 0.7 in said machinability evaluation test. This effect contributes much for enhancing the machining efficiency for alumina-based ceramic parts thereby improving the cost performance for producing the parts. Furthermore, the ceramic of this invention is dense (or closed) enough to have few open pores, so that it is suitable for ceramic parts to be used under a high vacuum atmosphere, such as of semiconductor treatment.

If $(I-IO)/IO$ exceeds 0.7, the superiority in the machinability of the ceramic against the conventional sintered alumina-based ceramic may not be secured. When $(I-IO)I/IO$ is adjusted to be equal to or less than 0.5, further improved machinability of the ceramic may be expected.

In the machinability evaluating test, as shown in FIG. 10A and 10B, when the grinding wheel 103 cuts the test piece of sintered ceramic 1 at a constant infeed depth, the contacting area between the wheel 103 and the test piece 1 increases with the advance of the cutting. The electric current of the motor ("motor current", hereinafter) I correspondingly increases with the increase in said contacting area, and reaches to an almost constant value when the lowest point of the wheel 103 cut into the test piece 1 since said contacting area also becomes constant. In the machinability evaluation test, this constant value is to be adopted as the motor current I.

Both for these first and second constitutions of this invention, good machinability of the ceramic cannot be secured for the range of average grain size less than 10 μm when the relative density is maintained to be equal to or higher than 95%. On the other hand, the strength of the sintered ceramic becomes insufficient when the average grain size exceeds 25 μm. The average grain size of the ceramic is preferably adjusted in a range of 10–20 μm.

Relative density lower than 95% makes the ceramic improper for high vacuum use since water or other molecules adsorbed in many open pores formed in the ceramic are discharged during the evacuation, thereby preventing the atmosphere from reaching to sufficient degree of vacuum. Furthermore, such porous structure may lower the strength of the ceramic. The relative density may be preferably adjusted to be equal to or higher than 97%.

The grinding wheel for the machinability evaluation test can be selected from grinding wheels standardized in JIS B4131 (1993) as long as having the designated dimension. On the other hand, the grain size distribution of the synthetic diamond abrasive grains may be set as 170/200 which is standardized in JIS B4130 (1982), for example.

The inventor also discovered that the machinability of alumina-based ceramic is closely related to the value of fracture toughness, Kc, and the machinability improves significantly in the range of Kc of equal to or lower than 3.0 MPam$^{1/2}$. Therefore, the third constitution of the sintered alumina-based ceramic of this invention is characterized by that the relative density is equal to or higher than 95%, the average grain size is in a range of 10–25 μm, and the fracture toughness, Kc, is equal to or lower than 3.0 MPam$^{1/2}$. In this invention, Kc means the fracture toughness measured by the indentation fracture (IF) method standardized in JIS R1607 (1990).

In this third constitution of the ceramic, the value of Kc equal to or higher than 3.0 MPam$^{1/2}$ may cause an insufficiency of machinability of the ceramic. The lower limit of Kc is to be set so that extreme decrease in the strength or in the wear resistance of the ceramic does not occur. Furthermore, it is preferable that the grinding load increase of the motor (or machining load) is equal to or less than 310 W (more preferably, equal to or less than 220 W), or that the value of (I–IO)/IO is equal to or less than 0.7 (more preferably, equal to or less than 0.5) in said machinability evaluation test also for this third constitution of the ceramic.

For all constitutions of the ceramic of this invention, the corrosion resistance, particularly that against the acid or alkaline attack may be improved by increasing the alumina content to a value equal to or more than 97 wt %. The corrosion resistance further improves for the alumina content equal to or more than 99 wt %.

The bending strength of the ceramic is preferably equal to or higher than 200 MPa. The ceramic having bending strength lower than 200 MPa can be adopted only for very limited field of ceramic parts because of the lack of durability. The bending strength is more preferably equal to or higher than 250 MPa. In this invention, the bending strength indicates that obtained at room temperature by the three-point bending test standardized in JIS R1601 (1981).

This invention also offers an alumina-based ceramic part characterized by that the ceramic consists of a sintered alumina-based ceramic whose relative density is equal to or higher than 95%, whose average grain size is in a range of 10–25 μm, or greater than 10–25 μm and at least a part of the surface of which is a machined-surface. In this invention, "machining" means a removal processing selected from grinding, sanding, polishing, cutting and drilling, or a combination processing of two or more thereof.

The sintered alumina-based ceramic having a relative density equal to or higher than 95% and an average grain size in 10–25 μm exhibits an excellent machinability for grinding, polishing, etc., and is suitable for high vacuum use because the number of opening pores decreases according to the sufficiently high relative density thereof. Therefore, the alumina-based ceramic part consisting of this sintered ceramic can be produced more easily in comparison with a conventional alumina-based ceramic having a poor machinability, and has no inferiority in the vacuum property, mechanical strength and chemical resistance. The sintered ceramic used for the ceramic part of this invention may be one of the first to third constitutions of said sintered alumina-based ceramics of this invention.

One of specific configurations of the alumina-based ceramic part of this invention can be formed in a flat-cylindrical shape having a wafer-mounting cavity on one axial end surface thereof and a positioning cavity on the other axial end surface thereof, wherein said two end surfaces are machined-surfaces ground to be almost parallel to each other. This ceramic part is used, for example, as a holder for holding a semiconductor wafer, such as a silicon wafer, in an apparatus for developing circuit patterns of IC or LSI according to a diffusion process In the apparatus where the wafer and the holder are located, an extremely high degree of vacuum is required, and high temperature and corrosive atmosphere is formed during the diffusion process, so that the holder should have sufficient vacuum property, mechanical strength and chemical resistance. The ceramic part described above can satisfy such requirements and be easily produced by a machining process at a cheaper cost.

DETAILED DESCRIPTION OF THE PREFERABLE EMBODIMENTS

Several embodiments of this invention will now be described with reference to drawings.

Figure 1A:
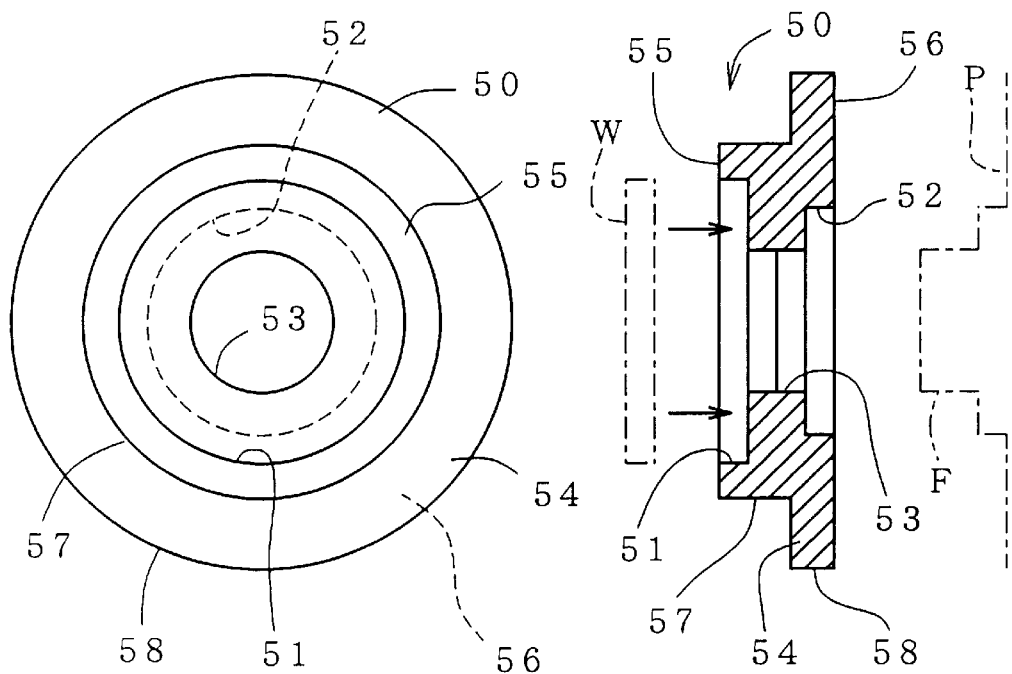
FIG. 1A schematically presents the first embodiment of the alumina-based ceramic parts of this invention.

FIG. 1A presents a semiconductor wafer holder as the first embodiment of the alumina-based ceramic part of this invention. The holder 50 consists of a sintered alumina-based ceramic regarding this invention. The alumina content of the ceramic is equal to or more than 97 wt % (preferably, equal to or more than 99 wt %) and the average grain size is adjusted in a range of 10–25 $\mu$m, (preferably, in a range of 10–20 $\mu$m). The fracture toughness of the ceramic, Kc, is equal to or lower than 3.0 MPam$^{1/2}$. Furthermore, the relative density thereof is equal to or higher than 95% (preferably, equal to or higher than 97%), and the bending strength is equal to or higher than 200 MPa (preferably, equal to or higher than 250 MPa).

Figure 2A:
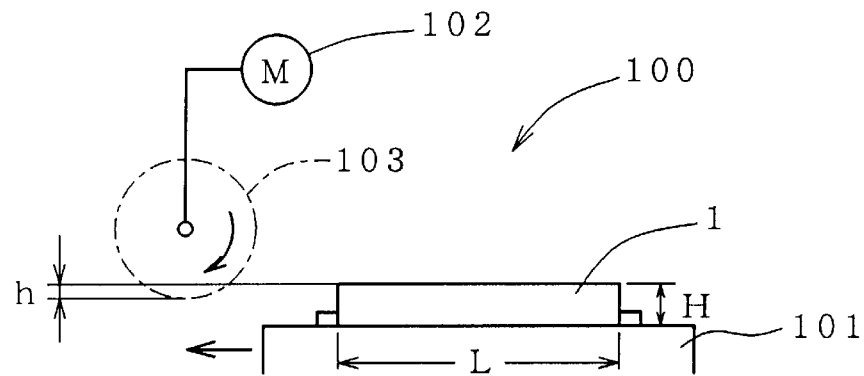
FIG. 2A is a schematic figure describing the method for evaluating the machinability of the ceramic test pieces.
Figure 2B:
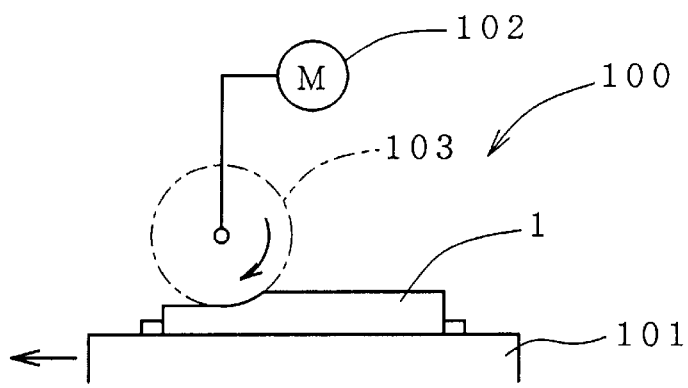
FIG. 2B is a schematic figure following to FIG. 2A.

The machinability of the sintered alumina-based ceramic ("sintered ceramic", hereinafter) is quantified by following machinability evaluation test. As shown in FIG. 2A and FIG. 2B, the dimension of the test piece 1 of the sintered ceramic with a dimension so as to be larger than 15 mm in width, larger than 30 mm in length (L) and larger than 10 mm in height (H). The test piece 1 is fixed on a table 101 of a surface grinder 100 and ground by a grinding wheel 103 along the direction of its length (L) at the condition that the circumferrential speed of the grinding wheel 103 rotated by a servo motor 102 is 2400 m/min, the traversing speed of the table 101 is 60 mm/min, and the infeed (h) per traverse is 3 mm, and the motor current I is measured. In this case, a larger value of the motor current I indicates that the ceramic is difficult to be machined, i.e., the machinability of the ceramic is poor. The grinding wheel 103 has a dimension of 10 mm in width and 200 mm in outer diameter, and consists of synthetic diamond abrasive grains more than 80 wt % of which are in a grain size range of 74–88 $\mu$m, and which are resin-bonded at 3.3 cts/cm$^3$ of weight content per unit volume.

As shown in FIG. 1A, the sintered ceramic used for the holder 50 exhibits equal to or less than 310 W (preferably, equal to or less than 220 W) of increase in the load on the motor 102 due to the grinding (machining load). Furthermore, the ceramic exhibits a value of (I–IO)/IO of equal to or less than 0.7, where I is the electric current of the motor 102 during grinding, and IO is the electric current of the motor 102 in an idling rotation without grinding. The machining load can be calculated as E×(I–IO), where E is the value of designated constant voltage applied to the motor 102.

As shown in FIG. 1A, the holder 50 is formed in a flat-cylindrical shape and has a wafer-mounting cavity 51, in which a water W is mounted, on one axial end surface 55 and a positioning cavity 52 on the other end surface 56. These two cavities 51 and 52 are joined by a through hole 53. The positioning cavity 52 and the through hole 53 are engaged with a protrusion F formed on the mounting plane P in the semiconductor treating apparatus, thereby positioning the holder 50 along with the wafer W in a designated site in the apparatus. The circumferrential portion of the holder 50 is radially protruded and forming a flange 54 at the side of the positioning cavity 52 for a stable fixture of the holder 50 on the mounting plane P.

The two end surfaces 55,56 of the holder 50 are ground to be almost parallel to each other. Furthermore, whole part of the circumferrential surfaces 57,58 and inner surfaces of the mounting cavity 51, the through hole 53 and the positioning cavity 52 are finished by grinding. However, machining for a part of surfaces (circumferrential surfaces 57,58, for example) can be omitted.

One example of the methods for producing the holder 50 is described in the following. First of all, designated amount of sintering aids (SiO$_2$, MgO, CaO, rare earth oxides, and so on) and binders are mixed with an alumina powder whose average particle size is adjusted in 0.1–5 $\mu$m. The powder mixture obtained is moulded into a powder compact having a shape corresponding to the holder 50, and then fired at 1400–1700° C. for 2–10 hours. The powder compact can be produced according to a public-known powder compacting method, such as a die pressing, a rubber pressing, a cold isostatic pressing (CIP), an injection mold process, or a method using ceramic green sheets, and so on. On the other hand, the firing process of the powder compact can be performed not only by a sintering method using a conventional sintering furnace, but also by a hot pressing method or a hot isostatic pressing (HIP) method.

The sintered compact obtained is subjected to grinding for dimension adjustment and surface finishing, and then the final product, i.e., the holder 50 is completed. The grinding can be performed by using a conventional grinder, for example, a surface grinder for the end surfaces 55,56, a cylindrical grinder for the circumferrential surfaces 57,58, or an internal grinder for the cavities 51,52 and the through hole 53.

Figure 1B:
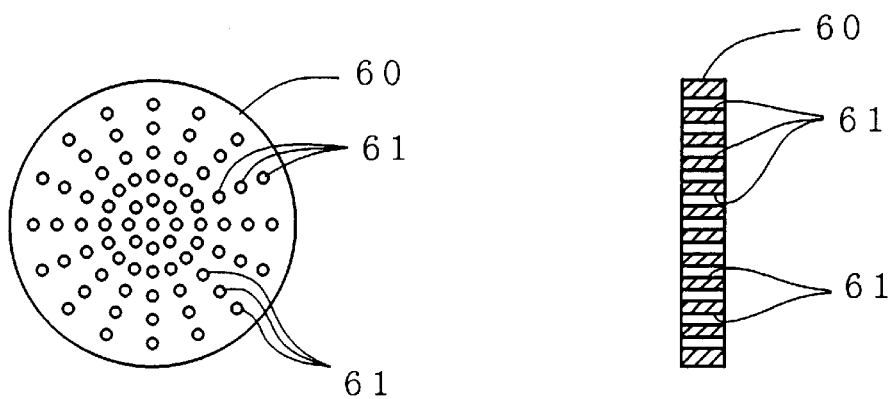
FIG. 1B schematically presents the second embodiment of the alumina-based ceramic parts of this invention.

FIG. 1B shows a chucking plate of a suction chuck system as the second embodiment of the ceramic part of this invention. The chucking plate 60 is attached to an unillustrated suction box and holds an object on its surface by a suction force generated at many dispersed suction holes 61 formed through the thickness thereof according to the evacuation inside the suction box. Such chucking plate can be produced as follows. First of all, a ceramic green sheet is formed by using a compound prepared by kneading ceramic-powder and binder. The green sheet is cut into a designated shape, formed many through holes, and then stacked and fired. Then, the obtained sintered compact is subjected to grinding at least for the surface intended to be used as the suction-chucking plane. If each suction hole 61 is large enough, the inner surface thereof can be ground by an axially rotating long and slim grinding wheel inserted therethrough at its circumferrential wheel face.

Figure 1C:
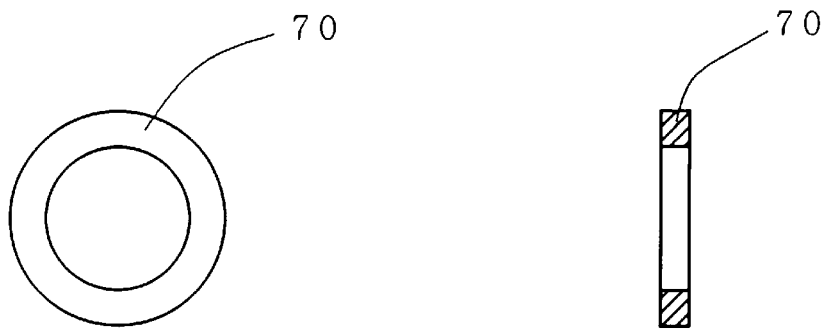
FIG. 1C schematically presents the third embodiment of the alumina-based ceramic parts of this invention.

FIG. 1C presents a ceramic seal ring as the third embodiment of the ceramic part of this invention. In the seal ring 70, the top and bottom end surfaces are machined-surface prepared by grinding and/or polishing.

Except for the embodiments described above, various ceramic parts such as sliding elements, etc. can be produced by using the ceramic of this invention. Furthermore, the machining performed to the ceramic sintered compact is not limited to grinding (including polishing), and other removal processing such as various cutting processes (for example, turning or milling), threading, drilling, and so on.

(Experimental example)

Powder mixtures were prepared by mixing designated amount of sintering aids (consisting of $SiO_2$, MgO and CaO; $SiO_2$:MgO:CaO—1:8:1 (in weight)) and binders with alumina powder whose average particle size is adjusted in 0.1–5 μm. The powder mixtures obtained were moulded into powder compacts by means of rubber pressing. The powder compacts were fired at 1400–1700° C. for 2–10 hours in air thereby becoming to sintered samples. Specific condition of the firing including the holding temperature and the holding period for each sample is shown in Table 1. Alumina content of each sintered sample was analyzed by means of ICP method. Average grain size of each sample was measured according to the following procedure so called as "line-intercept method", wherein a SEM photograph is taken at the fractured sample surface at 500 magnification, several lines are drawn on the photograph, and the average grain size is obtained as the mean length of line segments cut by each grain.

For each sample, relative density was measured by an Archimedes method, fracture toughness Kc was measured by the IF method standardized in JIS R1607 (1990), and the bending strength was measured by the three-point bending test standardized in JIS R1601 (1981), respectively. The values of relative density, alumina content, average grain size, bending strength and fracture toughness Kc are gathered in Table 1.

Figure 9A:
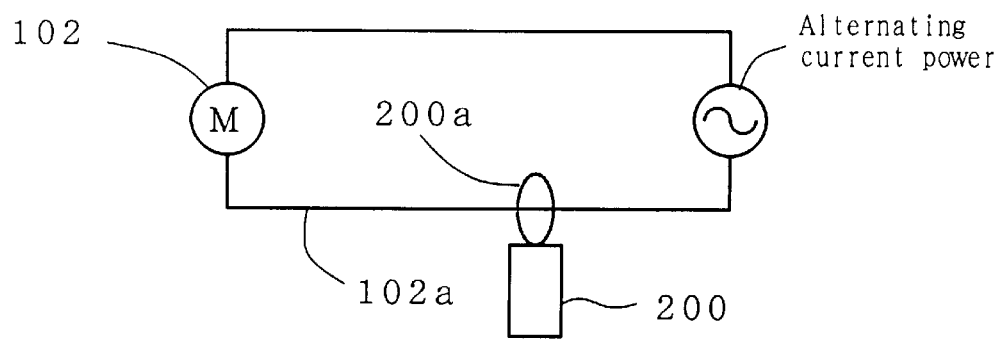
FIG. 9A is a schematic figure describing the method for measuring the motor current.
Figure 9B:
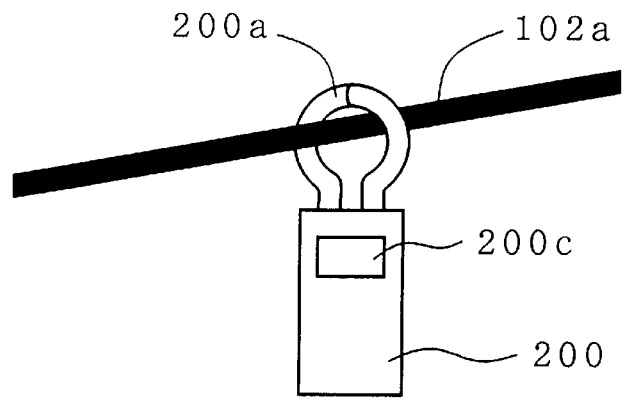
FIG. 9B is a schematic figure following to FIG. 9A.
Figure 9C:
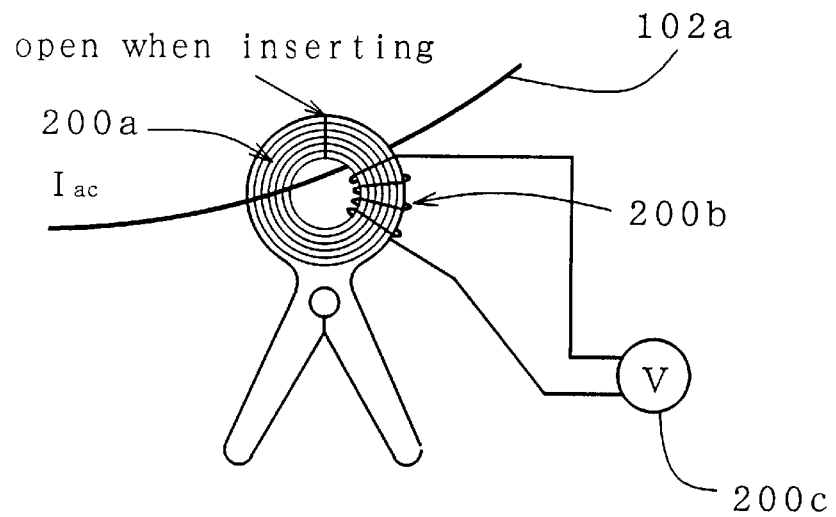
FIG. 9C is a schematic figure following to FIG. 9B.
Figure 10A:
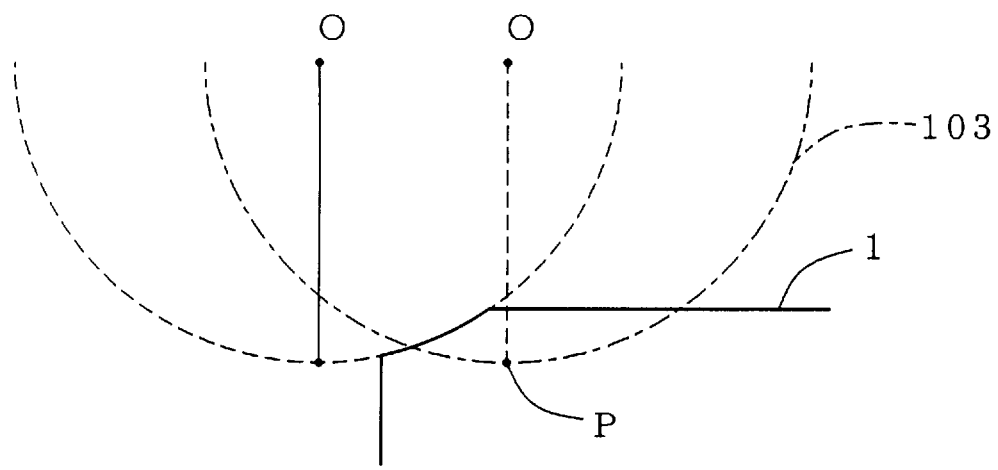
FIG. 10A schematically presents how the grinding wheel grinds the test piece.
Figure 10B:
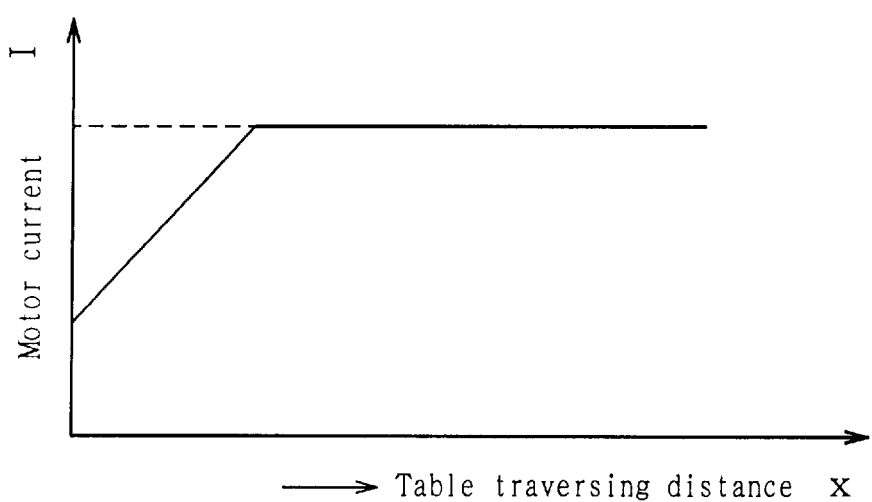
FIG. 10B schematically presents how the motor current changes with the advance of machining.

The machinability of each sample was evaluated by the machining load according to aforementioned machinability evaluation test (see FIG.2A and 2B). In this experiment, the test piece 1 has a block-like shape with a dimension of 50 mm in width, 30 mm in length and 20 mm in height and was ground along the length direction. A constant power voltage of 220 V was applied to the motor 102, where the electric current of the motor 102 in an idling rotation without grinding was 2.0 A. The motor 102 was an ac-servo motor (ratings: 1.5 kw, 220 V, 5.6 A, 60 Hz), and the motor current was measured by a clump ammeter (Hioki Denki Co. Ltd., "Leak Ammeter", #3263) as schematically shown in FIG. 9A–9C. As shown in FIG. 9B and 9C, the clump ammeter 200 has a snatch-ring like iron core 200a on which a coil 200b is wound. The iron core 200a is opened, the power cable 102a of the motor 102 is inserted through the opened core 200a, and then the core 200a is closed. An ac electric current Iac flowing the cable 102a induces a voltage in the coil 200b, and the current value Iac can be measured by detecting the voltage by a voltmeter 200c having a current scale.

Next, the influence of the relative density of the sample upon the vacuum degree of the atmosphere was investigated according to the following experiment. The ceramic sample was sealed into a furnace room of a vacuum furnace with a volume of 0.2 m³, and the furnace room was evacuated first at a rate of 650 liters/sec only by a rotary pump, and then evacuated at a rate of 900 liters/sec. by a combination of diffusion pump and a rotary pump. Then, the temperature in the furnace room was elevated to 500° C., the vacuum property of the ceramic was evaluated by the time consumed until the vacuum degree in the furnace room reaching to $1.0 \times 10^{-4}$ torr ("evacuation time", hereinafter)

Corrosion resistance of each samples in a sulfuric acid and an aqueous solution of sodium hydroxide according to the method standardized in JIS R1614 (1993) for investigating the relationship between the corrosion resistance and alumina content.

The results of the experiments are presented in Table 1 and FIG. 3–FIG. 6. The samples of sintered ceramic regarding this invention (No.5–11, 15) all exhibit good machinability and corrosion resistance while the comparable samples (No.1–4, 12–14, 16) are inferior in machinability or corrosion resistance.

Figure 3:
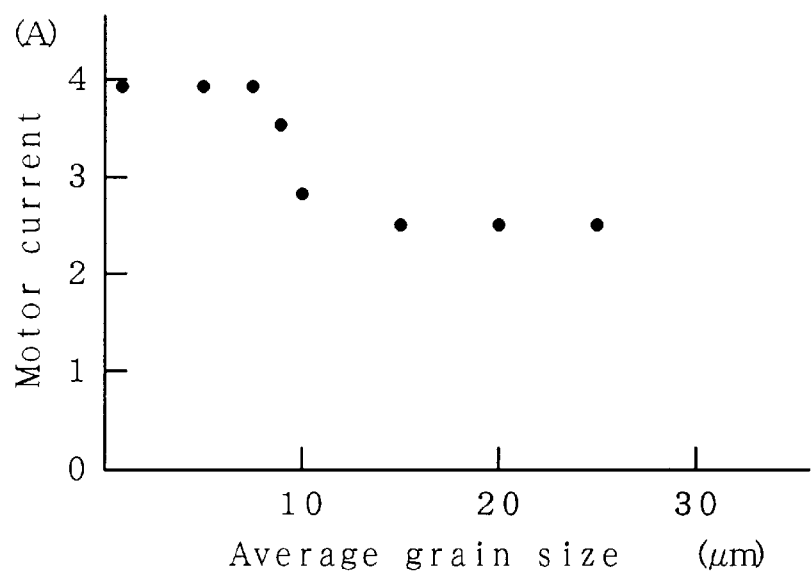
FIG. 3 presents the experimentally-obtained relationship between the average grain size of the ceramic and the motor current.
Figure 4:
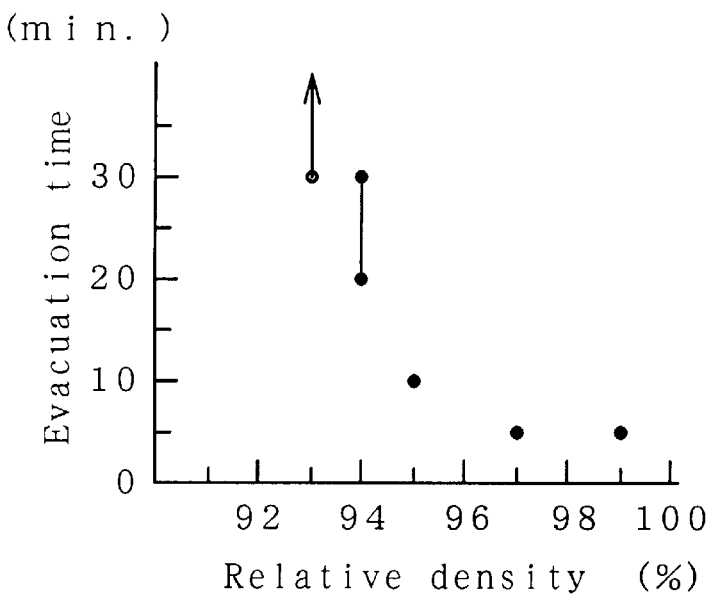
FIG. 4 presents the experimentally-obtained relationship between the relative density of the ceramic and the time consumed for achieving a required degree of vacuum.

FIG. 3 shows the relationship between the motor current and the average grain size of the samples. The motor current I decreases stepwise around 10 μm with increasing the average grain size. The level of the motor current I in the grain size range equal to or more than 10 μm is 30–40% lower than that in the grain size range less than 10 μm. On the other hand, FIG. 4 presents the relationship between the relative density and the evacuation time. The evacuation time becomes extremely long when the relative density is decreased below 95% while sufficient high vacuum degree can be achieved quickly for the range of the relative density equal to or higher than 95%.

Figure 5:
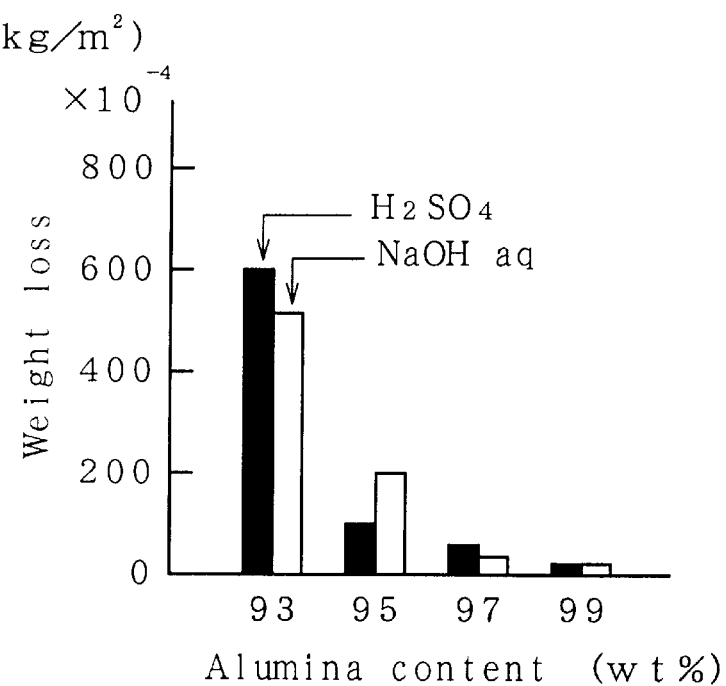
FIG. 5 presents the experimentally-obtained relationship between the alumina content of the ceramic and the corrosion resistivity.

FIG. 5 shows the relationship between the alumina content of the samples and the weight decrease of the sample in a sulfuric acid and in an aqueous solution of sodium hydroxide. The weight decrease becomes sufficiently small both in sulfuric acid and an aqueous solution of sodium hydroxide in a range of the alumina content equal to or more than 97%. The alumina content may be less than 97% if the requirement of the corrosion resistance is not very severe.

Figure 6:
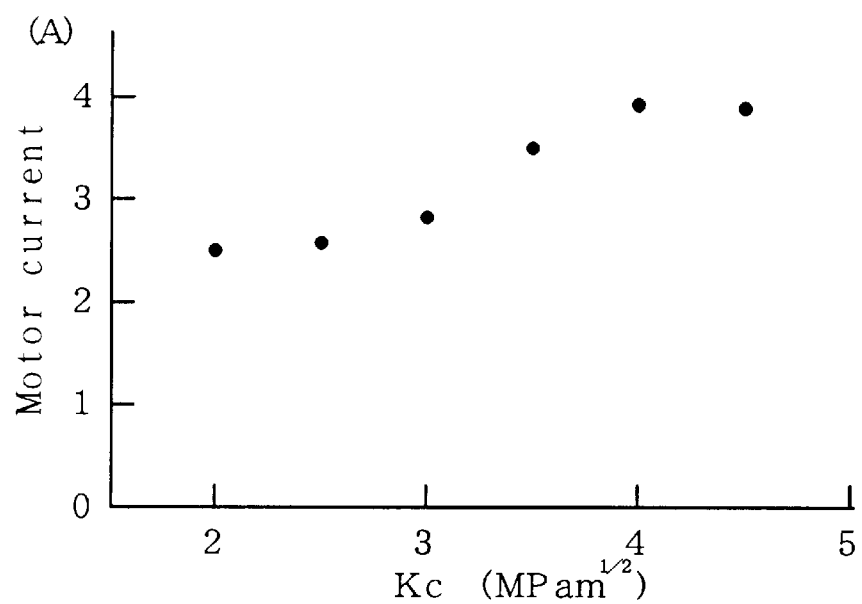
FIG. 6 presents the experimentally-obtained relationship between the fracture toughness of the ceramic and the motor current.
Figure 7A:
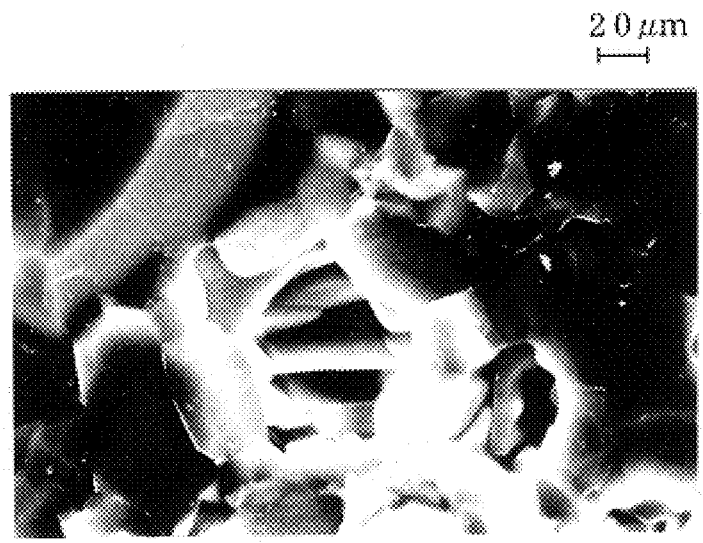
FIG. 7A is a SEM photograph taken at the fractured surface of the sintered ceramic sample No.6.
Figure 7B:
FIG. 7B is a SEM photograph taken at the fractured surface of the sintered ceramic sample No.7.
Figure 8A:
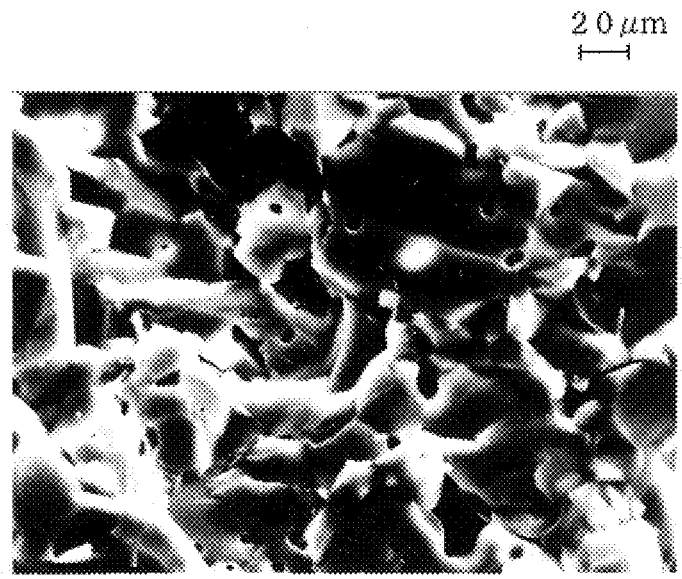
FIG. 8A is a SEM photograph taken at the fractured surface of the sintered ceramic sample No.9.
Figure 8B:
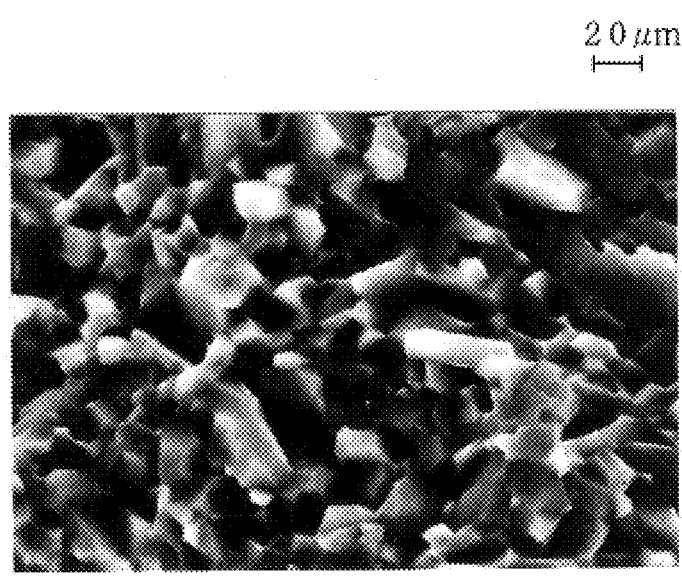
FIG. 8B is a SEM photograph taken at the fractured surface of the sintered ceramic sample No.4.

FIG. 6 presents the relationship between the fracture toughness Kc of the samples and the motor current I. The motor current I becomes low, i.e., the machinability of the sample becomes high when the value of Kc is equal to or lower than 3.0 $Pam^{1/2}$. FIG. 7A, FIG. 7B and FIG. 8A are the SEM photographs for the samples No.6, 7 and 9 regarding this invention, respectively, and FIG. 8B is that for the comparative sample No.4.

TABLE 1

| Sample No. | Relative Density (%) | Firing Condition Temp. (° C.) | Firing Condition Time (h) | Average Grain Size (μm) | Alumina Content (wt %) | Three-Point Bending Strength MPa | Fracture Toughness (MPam$^{1/2}$) | Motor Current (A) | Machining Load (W) | Evacuation Time (Minutes) | Weight Loss (H$_2$SO$_4$) ×10$^{-4}$ (kg/m$^2$) | Weight Loss (NaOH) ×10$^{-4}$ (kg/m$^2$) |
|---|---|---|---|---|---|---|---|---|---|---|---|---|
| *1 | 99 | 1600 | 2 | 1 | 99 | 450 | 4.5 | 3.9 | 418 | 5 | 10 | 20 |
| *2 | 99 | 1600 | 5 | 5 | 99 | 450 | 4.0 | 3.9 | 418 | 5 | 20 | 20 |
| *3 | 99 | 1650 | 2 | 7.5 | 99 | 400 | 3.5 | 3.9 | 418 | 5 | 20 | 15 |
| *4 | 99 | 1650 | 2 | 9 | 99 | 400 | 3.5 | 3.5 | 330 | 5 | 15 | 20 |
| 5 | 99 | 1650 | 5 | 10 | 99 | 350 | 3.0 | 2.8 | 176 | 5 | 20 | 20 |
| 6 | 99 | 1680 | 6 | 15 | 99 | 250 | 2.5 | 2.5 | 110 | 5 | 20 | 20 |

TABLE 1-continued

| Sample No. | Relative Density (%) | Firing Condition Temp. (°C.) | Firing Condition Time (h) | Average Grain Size (μm) | Alumina Content (wt %) | Three-Point Bending Strength MPa | Fracture Toughness (MPam$^{1/2}$) | Motor Current (A) | Machining Load (W) | Evacuation Time (Minutes) | Weight Loss (H$_2$SO$_4$) ×10$^{-4}$ (kg/m$^2$) | Weight Loss (NaOH) ×10$^{-4}$ (kg/m$^2$) |
|---|---|---|---|---|---|---|---|---|---|---|---|---|
| 7 | 99 | 1700 | 6 | 20 | 99 | 250 | 2.5 | 2.5 | 110 | 5 | 15 | 20 |
| 8 | 99 | 1700 | 10 | 25 | 99 | 200 | 2.0 | 2.5 | 110 | 5 | 20 | 20 |
| 9 | 99 | 1680 | 6 | 12 | 97 | 300 | 2.5 | 2.6 | 132 | 5 | 60 | 40 |
| 10 | 97 | 1680 | 10 | 10 | 97 | 250 | 2.0 | 2.5 | 110 | 5 | 60 | 40 |
| 11 | 95 | 1680 | 10 | 10 | 97 | 250 | 2.0 | 2.5 | 110 | 10 | 70 | 50 |
| *12 | 94 | 1650 | 2 | 5 | 97 | 300 | 3.5 | 3.8 | 396 | 20 | 70 | 50 |
| *13 | 94 | 1650 | 2 | 5 | 97 | 300 | 3.0 | 3.5 | 330 | 30 | 80 | 50 |
| *14 | 93 | 1600 | 2 | 1 | 97 | 250 | 3.0 | 3.0 | 220 | 30 | 70 | 60 |
| 15 | 99 | 1650 | 10 | 11 | 95 | 250 | 3.0 | 2.8 | 176 | 5 | 100 | 200 |
| *16 | 99 | 1600 | 2 | 1 | 93 | 250 | 3.5 | 3.5 | 330 | 5 | 600 | 520 |

Sample numbers accompanied with "*" indicate comparative samples out of the scope of this invention

What is claimed is:

1. A sintered ceramic mainly composed of alumina whose relative density is equal to or higher than 95% and whose average grain size is in a range of 12–25 μm,
    and in a machinability evaluation test using a surface grinder, exhibiting equal to or less than 310 W of increase in the load on a motor rotating a grinding wheel of said surface grinder when said machinability evaluation test is performed under a condition in which:
    the dimension of a test piece of said sintered ceramic is larger than 15 mm in width, larger than 30 mm in length and larger than 10 mm in height;
    said test piece is fixed on a table of said surface grinder and ground by said grinding wheel along a direction of its length;
    said grinding wheel has a dimension of 10 mm in width and 200 mm in outer diameter, and consists of synthetic diamond abrasive grains more than 80 wt % of which are in a grain size range of 74–88 μm, and which are resin-bonded at 3.3 cts/cm$^3$ of weight content per unit volume;
    and circumferential speed of said grinding wheel is 2400 m/mm, the table traversing speed is 60 mm/min, and the infeed per traverse is 3 mm.

2. A sintered ceramic according to claim 1 whose average grain size is in a range of 12–20 μm.

3. A sintered ceramic according to claim 1 whose alumina content is equal to or more than 97 wt %.

4. A sintered ceramic according to claim 1 whose bending strength is equal to or higher than 200 MPa.

5. A sintered ceramic whose relative density is equal to or higher than 95% and whose average grain size is in a range of 12–25 μm,
    and in a machinability evaluation test using a surface grinder, exhibiting a value of (I–IO)/IO of equal to or less than 0.7, where I is the electric current of the motor rotating said grinding wheel during grinding, and IO is the electric current of said motor in an idling rotation without grinding, when said machinability evaluation test is performed under a condition in which:
    the dimension of a test piece of said sintered ceramic is larger than 15 mm in width, larger than 30 mm in length and larger than 10 mm in height;
    said test piece is fixed on a table of said surface grinder and ground by said grinding wheel along a direction of its length;
    said grinding wheel has a dimension of 10 mm in width and 200 mm in outer diameter, and consists of synthetic diamond abrasive grains more than 80 wt % of which are in a grain size range of 74–88 μm, and which are resin-bonded at 3.3 cts/cm$^3$ of weight content per unit volume;
    and circumferential speed of said grinding wheel is 2400 m/mm, the table traversing speed is 60 mm/min, and the infeed per traverse is 3 mm.

6. A sintered ceramic according to claim 5 whose average grain size is in a range of 12–20 μm.

7. A sintered ceramic according to claim 5 whose alumina content is equal to or more than 97 wt %.

8. A sintered ceramic according to claim 5 whose bending strength is equal to or higher than 200 MPa.

9. A sintered ceramic mainly composed of alumina whose relative density is equal to or higher than 95%, whose average grain size is in a range of 12– 25 μm, and whose fracture toughness, Kc, is equal to or lower than 3.0 MPam$^{1/2}$.

10. A sintered ceramic according to claim 9,
    in a machinability evaluation test using a surface grinder, exhibiting equal to or less than 310 W of increase in the load on a motor rotating a grinding wheel of said surface grinder when said machinability evaluation test is performed under a condition in which:
    the dimension of a test piece of said sintered ceramic is larger than 15 mm in width, larger than 30 mm in length and larger than 10 mm in height;
    said test piece is fixed on a table of said surface grinder and ground by said grinding wheel along a direction of its length;
    said grinding wheel has a dimension of 10 mm in width and 200 mm in outer diameter, and consists of synthetic diamond abrasive grains more than 80 wt % of which are in a grain size range of 74–88 μm, and which are resin-bonded at 3.3 cts/cm$^3$ of weight content per unit volume;
    and the circumferential speed of said grinding wheel is 2400 m/min, the table traversing speed is 60 mm/min, and the infeed per traverse is 3 mm.

11. A sintered ceramic according to claim 9,
    in a machinability evaluation test using a surface grinder, exhibiting a value of (I–IO)/IO of equal to or less than 0.7, where I is the electric current of the motor rotating said grinding wheel during grinding, and IO is the electric current of said motor in an idling rotation without grinding, when said machinability evaluation test is performed under a condition in which:
    the dimension of a test piece of said sintered ceramic is larger than 15 mm in width, larger than 30 mm in length and larger than 10 mm in height;

said test piece is fixed on a table of said surface grinder and ground by said grinding wheel along a direction of its length, said grinding wheel has a dimension of 10 mm in width and 200 mm in outer diameter, and consists of synthetic diamond abrasive grains more than 80 wt % of which are in a grain size range of 74–88 μm, and which are resin-bonded at 3.3 cts/cm$^3$ of weight content per unit volume;

and circumferential speed of said grinding wheel is 2400 m/min, the table traversing speed is 60 mm/min, and the infeed per traverse is 3 mm.

12. A sintered ceramic according to claim 9 whose average grain size is in a range of 12–20 μm.

13. A sintered ceramic according to one of claim 9 whose alumina content is equal to or more than 97 wt %.

14. A sintered ceramic according to claim 9 whose bending strength is equal to or higher than 200 Mpa.

15. A sintered ceramic part consisting of a sintered ceramic mainly composed of alumina whose relative density is equal to or higher than 95%, whose average grain size is in a range of 12–25 μm, and at least a part of the surface of which is a machined-surface formed by one of machining selected from grinding, sanding, polishing, cutting and drilling, or a combination of two or more thereof.

16. A sintered ceramic part according to claim 15, wherein in a machinability evaluation test using a surface grinder, said sintered ceramic exhibits equal to or less than 310 W of increase in the load on a motor rotating a grinding wheel of a surface grinder when said machinability evaluation test is performed under a condition in which:

the dimension of a test piece of said sintered ceramic is larger than 15 mm in width, larger than 30 mm in length and larger than 10 mm in height;

said test piece is fixed on a table of said surface grinder and ground by said grinding wheel along a direction of its length;

said grinding wheel has a dimension of 10 mm in width and 200 mm in outer diameter, and consists of synthetic diamond abrasive grains more than 80 wt % of which are in a grain size range of 74–88 μm, and which are resin-bonded at 3.3 cts/cm$^3$ of weight content per unit volume;

and circumferential speed of said grinding wheel is 2400 m/min, the table traversing speed is 60 mm/min, and infeed per traverse is 3 mm.

17. A sintered ceramic part according to claim 15, wherein in a machinability evaluation test using a surface grinder, said sintered ceramic exhibits a value of (I-IO)/IO of equal to or less than 0.7, where I is the electric current of the motor rotating said grinding wheel during grinding, and IO is the electric current of said motor in an idling rotation without grinding, when said machinability evaluation test is performed under a condition in which:

the dimension of a test piece of said sintered ceramic is larger than 15 mm in width, larger than 30 mm in length and larger than 10 mm in height;

said test piece is fixed on a table of said surface grinder and ground by said grinding wheel along a direction of its length;

said grinding wheel has a dimension of 10 mm in width and abrasive grains more than 80 wt % of which are in a grain size range of 74–88 μm, and which are resin-bonded at 3.3 cts/cm$^3$ of weight content per unit volume; and speed of said grinding wheel is 2400 m/min, the table traversing speed is 60 mm/min, and infeed per traverse is 3 mm.

18. A sintered ceramic part according to claim 15 wherein the fracture toughness, Kc, of said sintered ceramic is equal to or lower than 3.0 MPam$^{1/2}$.

19. A sintered ceramic part according to claim 15 wherein the average grain size of said sintered ceramic is in a range of 12–20 μm.

20. A sintered ceramic part according to claim 15 wherein the alumina content of said sintered ceramic is equal to or more than 97 wt %.

21. A sintered ceramic part according to claim 15 wherein the bending strength of said sintered ceramic is equal to or higher than 200 MPa.

22. A sintered ceramic part according to claim 15 which is formed in a cylindrical shape having a wafer-mounting cavity on one axial end surface and a ceramic part positioning cavity on the other axial end surface thereof, and wherein said axial end surfaces are machined surfaces ground to be almost parallel to each other.

* * * * *